United States Patent
Hong

(10) Patent No.: US 7,516,269 B2
(45) Date of Patent: Apr. 7, 2009

(54) FOLDING USB FLASH MEMORY DEVICE FOR PROVIDING MEMORY STORAGE CAPACITY

(75) Inventor: Si-Hoon Hong, Yongin-shi (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 11/511,027

(22) Filed: Aug. 28, 2006

(65) Prior Publication Data

US 2006/0294306 A1    Dec. 28, 2006

Related U.S. Application Data

(62) Division of application No. 10/737,148, filed on Dec. 16, 2003, now Pat. No. 7,124,238.

(30) Foreign Application Priority Data

Dec. 17, 2002    (KR) ................................ 02-80614

(51) Int. Cl.
G06F 12/00    (2006.01)
(52) U.S. Cl. ........................ 711/103; 711/115
(58) Field of Classification Search ............... 711/101, 711/103, 156
See application file for complete search history.

(56) References Cited

U.S. PATENT DOCUMENTS

| | | | |
|---|---|---|---|
| 5,905,528 A | 5/1999 | Kodama | |
| 6,148,354 A | 11/2000 | Ban et al. | 710/102 |
| 6,816,071 B2 | 11/2004 | Conti | 340/540 |
| 7,042,804 B2 * | 5/2006 | Guanter | 368/10 |
| 2002/0054232 A1 | 5/2002 | Inagaki | 348/372 |
| 2003/0103156 A1 | 6/2003 | Brake et al. | 348/333.01 |
| 2003/0167376 A1 | 9/2003 | Koh | 711/115 |
| 2004/0073727 A1 | 4/2004 | Moran et al. | 710/74 |
| 2004/0111553 A1 * | 6/2004 | Conley | 711/103 |

FOREIGN PATENT DOCUMENTS

| | | |
|---|---|---|
| CN | 1351350 | 5/2002 |
| JP | 2001-319745 | 11/2001 |
| KR | 2002-0057360 | 7/2002 |

* cited by examiner

Primary Examiner—Reginald G Bragdon
Assistant Examiner—Baboucarr Faal
(74) Attorney, Agent, or Firm—Mills & Onello, LLP

(57) ABSTRACT

A USB flash memory device connected to a USB bus includes a flash memory module including at least one flash memory, a USB connector for transferring data packets onto the USB bus and receiving the data packets from the USB bus, a USB controller for controlling the USB connector according to the data packets and for controlling storage of data in and retrieval of data from the flash memory module, a display controller for storing memory storage capacity information of the flash memory module in a usage display register, a display window for displaying a value that is based on the content of the usage display register, and a power unit for supplying a power to the USB flash memory device. The USB connector is configured to be coupled to the USB bus. The USB flash memory device further includes a folding portion which is proximal to the USB connector and enables the USB flash memory device to be folded. According to the present invention, data storage information of the USB flash memory device and additional information such as current time and data storage time can be visually determined through the display window, even in cases where the USB flash memory device is not coupled to the host platform. Further, the folding portion of the USB flash memory device enhances space usability and efficiency.

2 Claims, 6 Drawing Sheets

FOLDING USB FLASH MEMORY DEVICE FOR PROVIDING MEMORY STORAGE CAPACITY

RELATED APPLICATIONS

This application is a divisional of U.S. application Ser. No. 10/737,148, filed on Dec. 16, 2003, now U.S. Pat. No. 7,124,238, which relies for priority upon Korean Patent Application No. 02-80614, filed on Dec. 17, 2002, the contents of which are herein Incorporated by reference in their entirety.

FIELD OF THE INVENTION

The present invention relates to a portable data storage device and, more particularly, to a USB flash memory device including a non-volatile memory device for providing memory storage capacity.

BACKGROUND OF THE INVENTION

Conventional data storage devices generally fall into two categories. The first category is electronic, solid-state memory devices such as read only memory (ROM) and random access memory (RAM). These memory devices are generally fixed within a computer. They are not intended to be removable or portable so that they may be used on different computers to permit the transfer of data from one computer to another computer.

The second category is surface-based data storage devices in which data is stored, typically, on the surface of a disk or tape. Examples of surface storage devices are magnetic disks, CD-ROMs, and USB disks coupled externally to the computer through a mechanical drive mechanism to be installed in, or coupled to, the computer. Accordingly, the magnetic disks or CD-ROMs are removable and portable.

The USB disk includes a flash memory device therein to store real-time data, voice, and audio and video data. An example of the USB disk is disclosed in U.S. Pat. No. 6,148,354. FIG. 1 is a re-creation of FIG. 5 of the above patent and shows a computer host system having a USB flash memory device.

Referring to FIG. 1, a flash memory system 42 includes a host platform 44 for operating a non-volatile USB flash memory storage device. The host platform 44 is connected to a USB flash memory device 46 through a USB cable 48 and is connected to the USB cable 48 through a USB host connector 50. The USB flash memory device 46 is connected to the USB cable 48 through a USB flash device connector 52. The host platform 44 includes a USB host controller 54 for controlling and managing USB transmission on a USB bus. The USB flash memory device 46 has a USB flash memory device controller 56 for controlling the USB flash memory device 46 and for managing the interface with the USB flash-memory device 46 and USB bus, the USB flash memory device connector 52, and at least one flash memory module 58. Preferably, the flash memory module 58 includes a flash memory module array in which data is stored.

When the USB flash memory device 46 is coupled to the host platform 44, a standard USB process is established. During the USB process, the host platform 44 configures the arrangement of the USB flash memory device 46 and the data transfer mode with the USB flash memory device 46. During the course of the configuration, the host platform 44 determines the overall storage capacity of the USB flash memory device 46 and determines the remaining, unused, capacity. In this manner, information related to the storage capacity of the USB flash memory device 46 is determined by directly connecting the USB flash memory device 46 to the USB host connector 50 of the host platform 44.

Unfortunately, the above conventional method of perceiving the data storage capacity of the USB flash memory device 46 has disadvantages in that it is required that the computer system of the host platform 44 must be powered up and the USB flash memory device 46 must be connected to the USB host connector 50 for determining storage capacity information of the flash memory device 46.

SUMMARY OF THE INVENTION

The present invention is directed to a USB flash memory device in which data storage capacity can be perceived in a manner that overcomes the disadvantages of the conventional approaches. In particular, data storage capacity can be perceived independent of a host computer system.

A feature of the present invention is to provide a USB flash memory device for providing memory storage capacity.

Another feature of the present invention is to provide a flash memory device for providing memory storage capacity.

Still another feature of the present invention is to provide a folding USB flash memory device.

According to an aspect of the present invention, a USB flash memory device for displaying a memory storage capacity includes a flash memory module including at least one flash memory, a USB controller for controlling storage of data in and reading of data from the flash memory module, a display controller for storing the memory storage capacity information of the flash memory module in a usage display register, a display window for displaying a value that is based on the content of the usage display register, and a power unit for supplying power to the USB flash memory device.

Preferably, the flash memory includes a data storage area in which a plurality of flash cells are disposed in a matrix of rows and columns and a state storage area storing a last address used in the data storage area. The display controller includes the usage display register and further includes a controller for receiving a last used address from the flash memory module and comparing the last used address with the overall capacity of the flash memory module to determine the memory storage capacity information, and a multiplexer for selectively outputting the value that is based on the content of the usage display register or an output of the USB controller to be transmitted by the display window. The usage display register may be directly controlled by the USB controller. The USB controller calculates the memory storage capacity of the flash memory module when returning from a power-down mode or when the power unit of the USB flash memory module is turned on. The display window further displays current time, data storage time, and data transfer. The display windows display the memory storage capacity in a graphic manner or in a textual manner.

According to another aspect of the present invention, a flash memory device includes a data storage area in which a plurality of flash cells are disposed in a matrix of rows and columns and a state storage area storing a last used address of the data storage area. The last used address can be stored in a register of the stage storage area.

According to still another aspect of the present invention, a USB flash memory device includes at least one flash memory device for storing data, a USB connector for transferring data packets onto a USB bus and for receiving data packets from the USB bus, and a folding portion for enabling the USB flash memory device to be folded. The USB connector is configured to be coupled to the USB bus, and the folding portion is disposed proximal to the USB connector.

According to yet another aspect of the present invention, a USB flash memory device includes a flash-memory module including at least one flash memory, a USB connector for transferring data packets onto the USB bus and receiving the data packets from the USB bus, a USB controller for controlling the USB connector according to the data packets and controlling storage of data in and reading of data from the flash memory module, a display controller for storing a memory storage capacity information of the flash memory module in a usage display register, a display window for displaying a value that is based on the content of the usage display register, a power unit for supplying a power to the USB flash memory device, and a folding portion for enabling the USB flash memory device to be folded. The USB connector is configured to be coupled to the USB bus, and the folding portion is disposed proximal to the USB connector.

BRIEF DESCRIPTION OF THE DRAWINGS

The foregoing and other objects, features and advantages of the invention will be apparent from the more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF PREFERRED EMBODIMENTS

Figure 1:
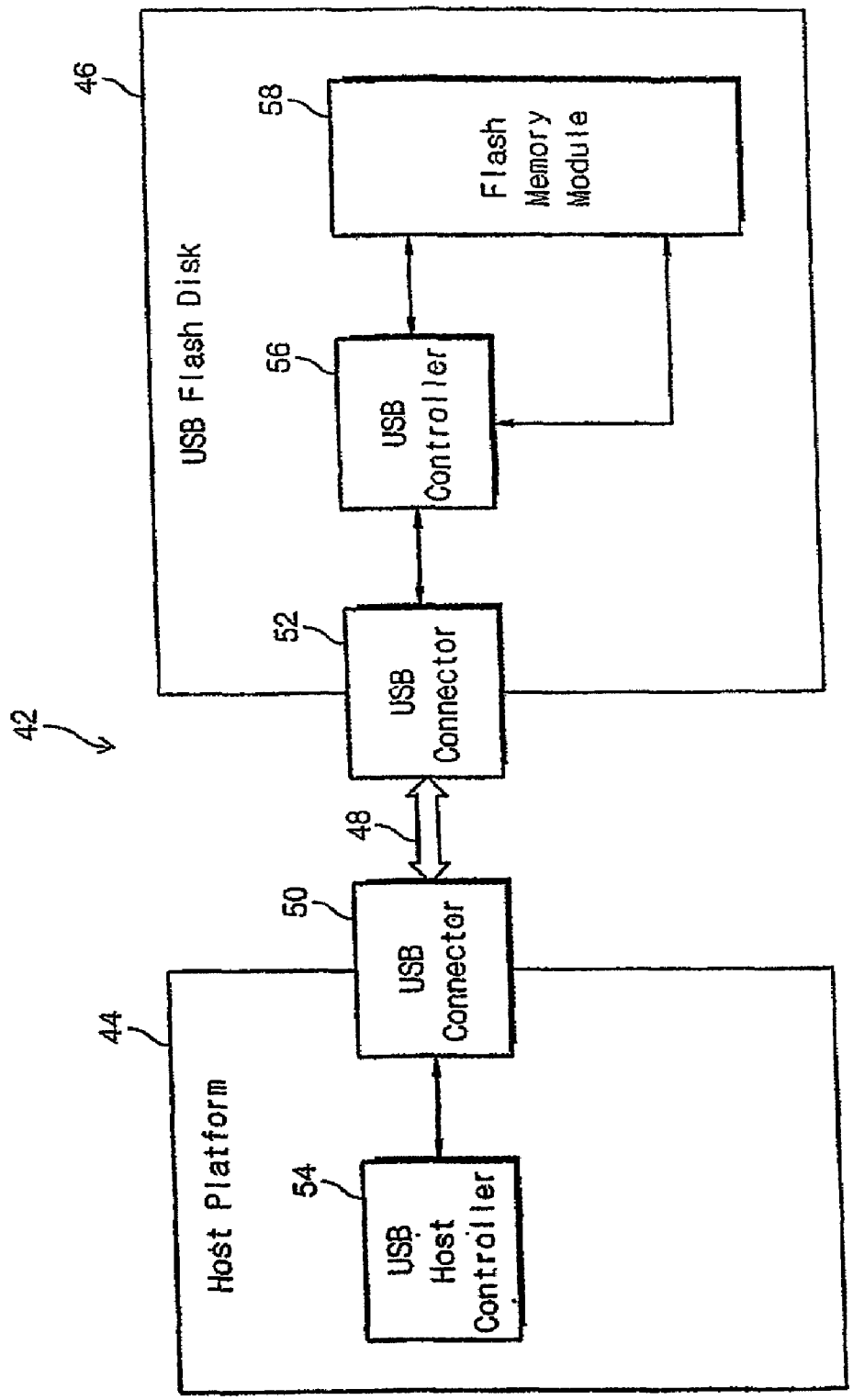
FIG. 1 is a block diagram of a conventional USB flash memory device.
Figure 2:
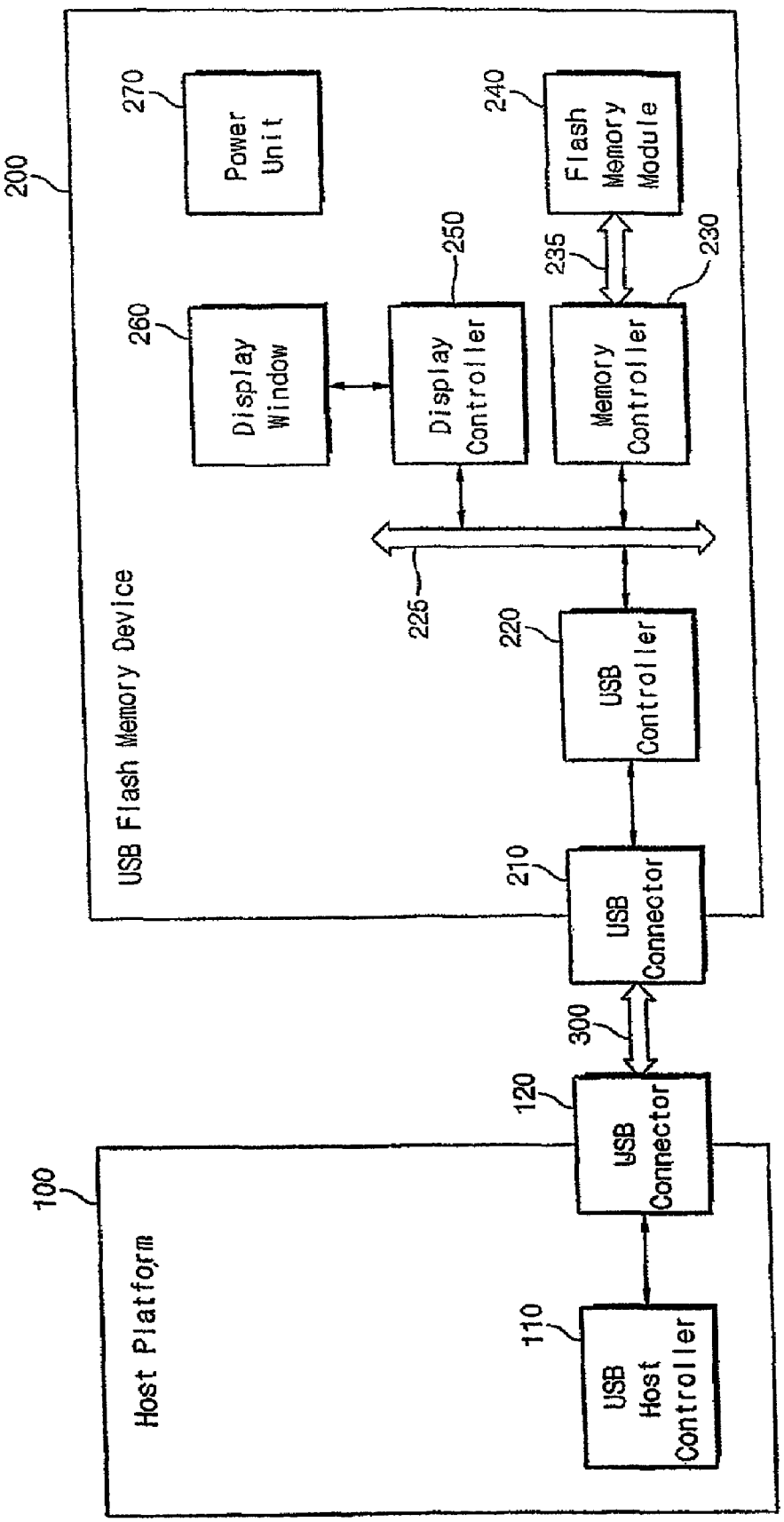
FIG. 2 is a block diagram of a USB flash memory device according to an embodiment of the present invention.

A USB flash memory device and a host platform according to an embodiment of the present invention are illustrated in FIG. 2.

Referring to FIG. 2, a host platform 100 and a USB flash memory device 200 are connected through a USB cable 300. The host platform 100 includes a USB host controller 110 and a USB connector 120. The USB flash memory device 200 includes a USB connector 210, a USB controller 220, a memory controller 230, a flash memory module 240, a display controller 250, a display window 260, and a power unit 270.

The host platform 100 issues commands and requests to the USB flash memory device 200 to provide a service from the USB flash memory device 200 for the USB host controller 110. Typically, the host platform 100 is in the form of a computer, a digital camera, an electronic notebook, a personal digital assistant (PDA), a camcorder, a digital TV, and the like. The USB host controller 110 transfers data packets onto the USB cable 300. The packets are received by the USB controller 220 via USB connector 210. The USB controller 220 performs a variety of operations such as reading, writing, and erasing data to and from the flash memory module 240, and supports basic USB functionality such as device enumeration or configuration in the USB flash memory device 200. The USB controller 220 is connected to the flash memory module 240 through the memory controller 230.

The flash memory module 240 includes at least one flash memory device in which typically NAND flash cells or NOR flash cells are arranged. The flash memory module 240 is connected to the USB controller 220 through an address/data bus 235 and the memory controller 230. The USB controller 220 sends power signals and various control signals for controlling the flash memory module 240 to the flash memory module 240 through a system bus 225. Such signals may comprise, for example, a chip selecting signal, a reading signal, and a writing signal. The flash memory module 240 reads, writes (stores), and erases data in response to these signals. Assuming the flash memory module 240 includes, for example, two memory modules of 60 Mbits each, an address translation table for addressing the memory at the host platform 100 is embedded in the flash memory module 240 and address mapping is performed through the memory controller 230. All commands and return codes between the host platform 100 and the USB flash memory device 200 are transmitted via a USB data packet and are sent through the USB cable 300.

While writing data to the flash memory module 240, the last occupied address is stored in flash memories of the USB controller 220 and the flash memory module 240. The USB controller 220 calculates and compares the last address stored with the overall memory capacity of the flash memory module 240 and stores the result of the comparison in a usage display register. The memory storage capacity represents, for example, the amount of memory capacity that is currently used and how much usable memory capacity remains. The content of the usage display register is transmitted to a display window 260 through a display controller 250. In one application, the USB controller 220 transmits the value of the usage display register to the display window 260 in response to a command received by the USB host controller 110 that requests the amount of memory capacity that remains in the flash memory module 240. In addition, this same information can be transmitted to the USB host controller via the USB cable according to the conventional means described above.

In the event that the power unit 270 of the USB flash memory device is cut off, to thereby make it impossible to determine the memory storage capacity of the device, the last address stored in the flash memory of the flash memory module 240 is used to determine the memory storage capacity when the USB flash memory device 200 is coupled to the USB connector 120 of the host platform 100, as in the conventional approach.

According to another embodiment, the flash memory is partitioned into a data storage area and a state information area. Data is written to the flash memory in the data storage area, and the same information as data storage information stored in the usage display register of the display controller 250 is stored in the state information area. In this manner, the memory capacity related information is stored and retrieved from the flash memory device itself.

The display controller 250 is now explained in detail with reference to FIG. 3.

Figure 3:
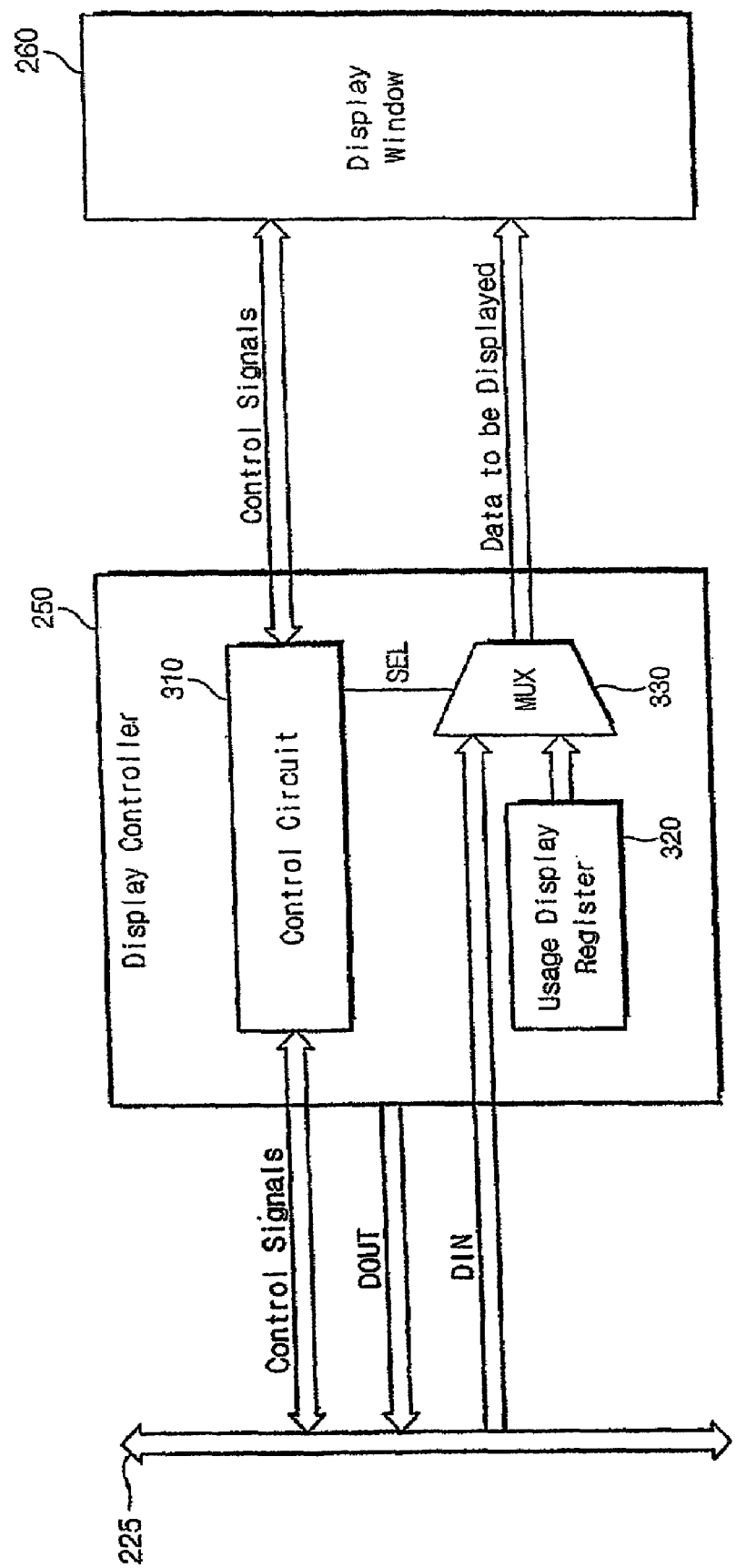
FIG. 3 is a circuit diagram of a display controller of the USB flash memory device of FIG. 2.

Referring to FIG. 3, the display controller 250 includes a control circuit 310, a usage display register 320, and a multiplexer (MUX) 330. The control circuit 310 receives memory use information, e.g., the last address used, from the non-volatile memory in the flash memory module (240 of FIG. 2) when a power unit (270 of FIG. 2) is turned on or when a USB flash memory device (200 of FIG. 2) is released from a power-down mode. Thereafter, the control circuit 310 compares the memory use information with the overall memory capacity of the unit, and stores the memory use information in the usage display register 320, since, in the absence of power to the display controller 250, the previous value of the usage display register 320 is erased or lost. The multiplexer 330 controls the data to be displayed, selecting either a data DIN from an external input or the data of the usage display register in response to a selection signal SEL generated by the control circuit 310.

The display window 260 of FIG. 2 may display data storage information such as the overall memory capacity of the flash memory module 240, used memory capacity, and usable memory capacity, as well as additional information such as current time, data storage time, and data transfer information.

Figure 4A:
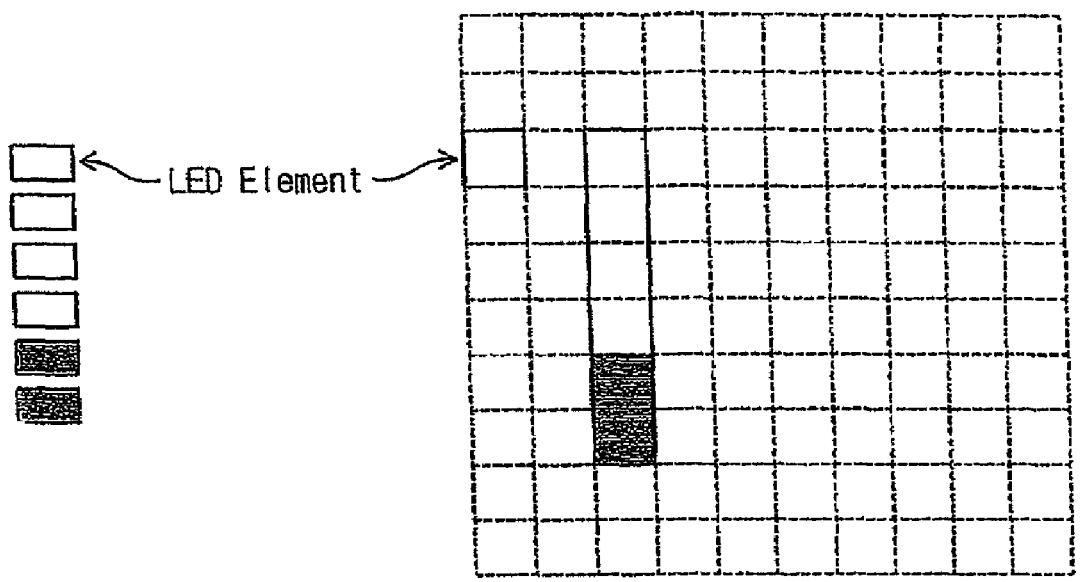
FIGS. 4A and 4B show the display window of the device of FIG. 2.
Figure 4B:
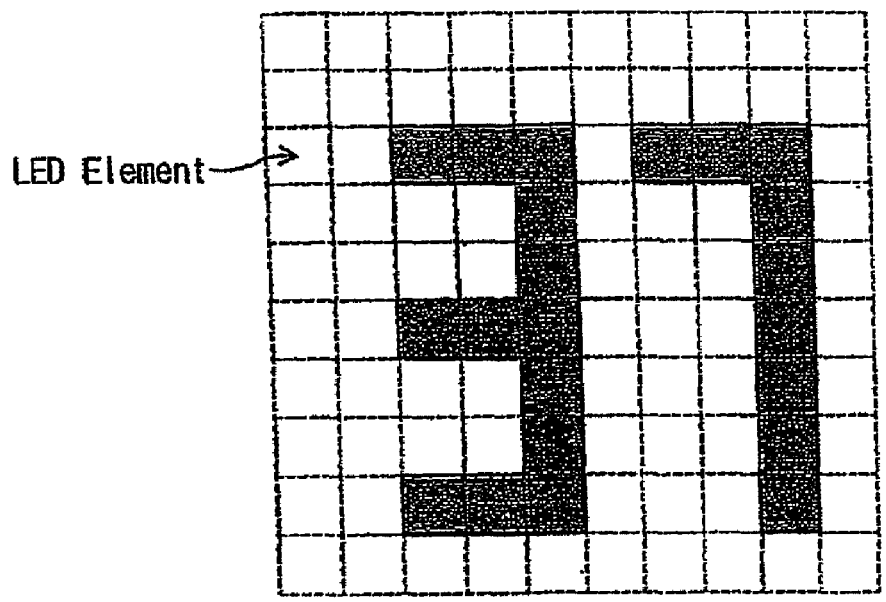

The display window 260 is now explained in further detail with reference to FIG. 4A and FIG. 4B. In the example of FIG. 4A, information is displayed graphically using an LED array. In the example of FIG. 4B, textual information is displayed on a 2-D array of pixels, for example on a liquid crystal display (LCD). Any of a number of techniques can be employed to achieve visual representation of the data.

In one embodiment, the power unit 270 of FIG. 2 is an independent power unit for supplying power to the USB flash memory device 200. When the power unit 270 is turned on, power is selectively supplied to the USB controller 220, the memory controller 230, the flash memory module 240, the display controller 250, and the display window 260 in the USB flash memory device 200. Therefore, as previously stated, it is possible to determine memory storage capacity information of the USB flash memory device 200, even in a case where the USB flash memory device 200 is not connected to the USB connector 120 of the host platform 100.

In this manner, the USB flash memory device of the present invention may convey memory usage information through a display window and provide additional information such as current time, data storage time, and data transfer information without being installed at the host platform 100.

Figure 5:
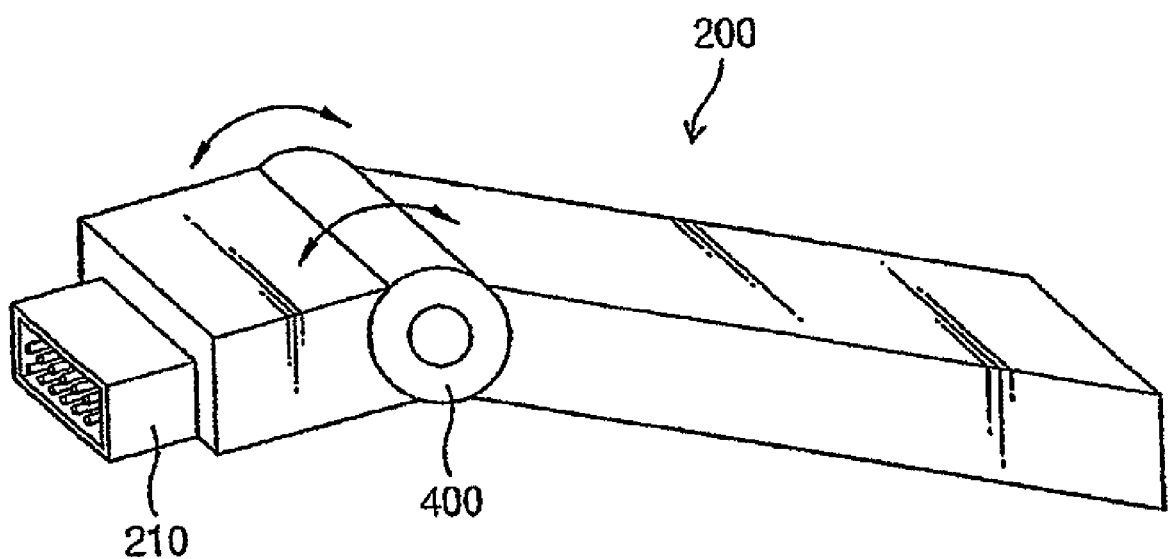
FIG. 5 is a perspective view of a USB flash memory device according to another embodiment of the present invention.

A perspective view of the USB flash memory device 200 according to the present invention is illustrated in FIG. 5. Referring to FIG. 5, the body of the USB flash memory device 200 may include a folding portion 400, such as a hinge, that is disposed near the USB connector 210. In this manner, the body of the USB flash memory device 200 can be folded at the folding portion 400.

Figure 6:
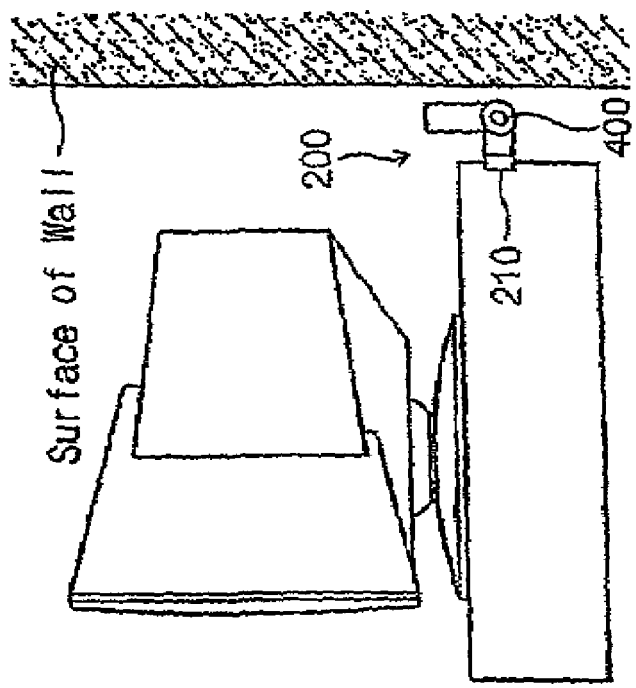
FIG. 6 is a side view of the USB flash memory devices of FIG. 1 and FIG. 5 as connected to a personal computer.
Figure 6:
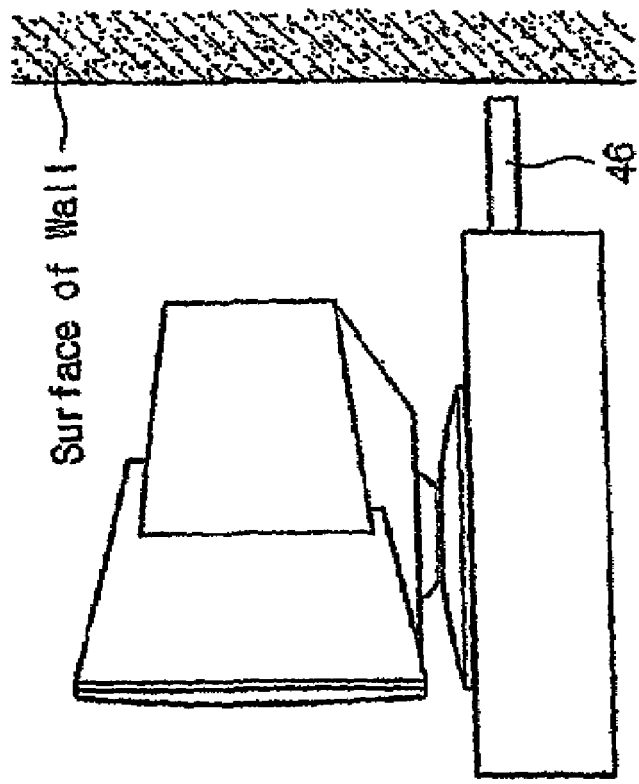

Assuming the host platform 100 to be, for example, a personal computer, as illustrated at the left diagram of FIG. 6, a conventional memory device 46 is inserted into a USB port disposed at the rear side of a personal computer body. Generally, the length of the USB flash memory device 46 is about 10 cm. In the case where the personal computer body is proximal to the surface of a wall, it must be spaced apart from the surface of the wall at least a distance equal to the length of the USB flash memory device 46. However, according to the present invention, the USB flash memory device 200 including a folding portion 400 enhances space usability and efficiency because the personal computer body can be more closely positioned relative to the surface of the wall by folding the folding portion 400, as illustrated in the right diagram of FIG. 6.

While this invention has been particularly shown and described with references to preferred embodiments thereof, it will be understood by those skilled in the art that various changes in form and details may be made herein without departing from the spirit and scope of the invention as defined by the appended claims.

What is claimed is:

1. A USB flash memory device comprising:
 a data storage area in which a plurality of flash cells are disposed in a matrix of rows and columns; and
 a state storage area storing a last address used of the data storage area in connection with a write operation of the USB flash memory device, wherein the last address is used to determine overall memory storage capacity information of the USB flash memory device, wherein the overall memory storage capacity information includes information on the amount of memory capacity that is used and the amount of available usable memory capacity that remains, wherein the state storage area includes a register storing the last address, and wherein when the flash memory device is disconnected from a host platform or other powering device, the overall memory storage capacity information is determined by the last address stored in the register of the state storage area and wherein the USB flash memory device has a display window that displays the overall memory storage capacity information.

2. The flash memory device as recited in claim 1, wherein at least one of NAND flash cells and NOR flash cells are arranged in the flash memory device.

* * * * *